UNITED STATES PATENT OFFICE.

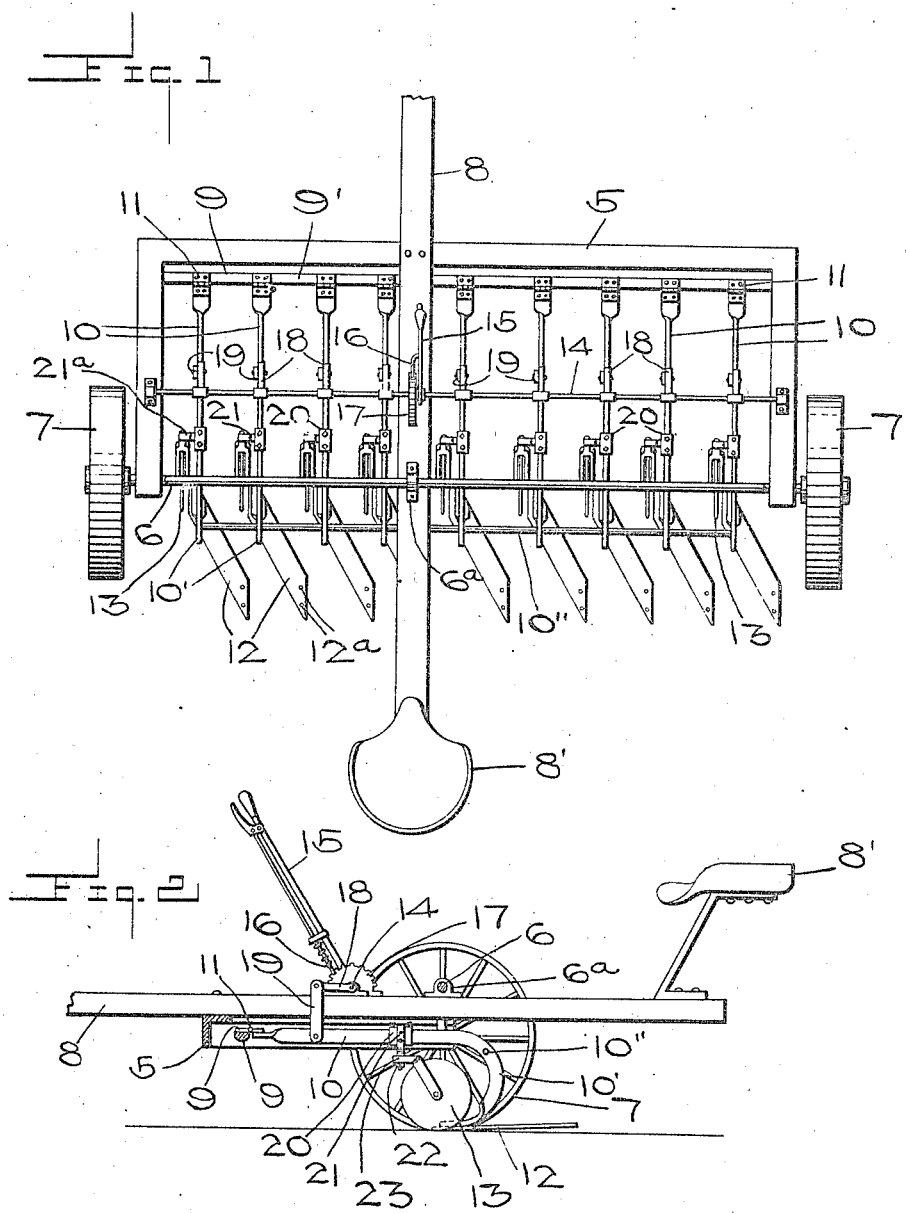

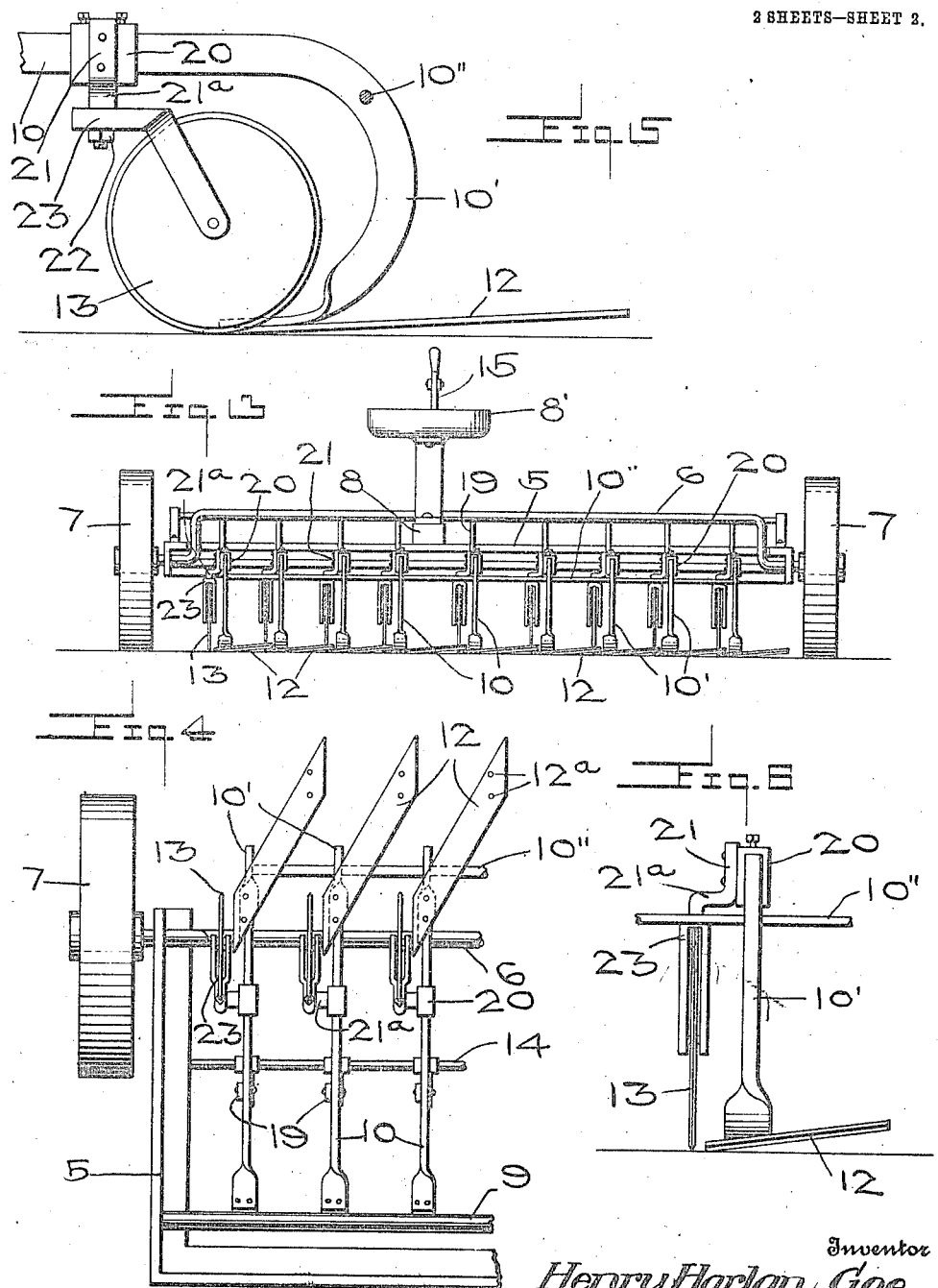

HENRY HARLAN GOE, OF PRESCOTT, WASHINGTON.

WEEDING-MACHINE.

970,212.  Specification of Letters Patent.  Patented Sept. 13, 1910.

Application filed January 7, 1910. Serial No. 536,848.

*To all whom it may concern:*

Be it known that I, HENRY HARLAN GOE, a citizen of the United States, residing at Prescott, in the county of Walla Walla and State of Washington, have invented certain new and useful Improvements in Weeding-Machines, of which the following is a specification.

This invention has relation to certain new and useful improvements in weeders or cultivators, and has for its object to provide a machine of this character which is simply constructed and is adapted to clear the ground of stalks, weeds, vines and other growths which are detrimental to the cultivation of various farm products.

A further object is to provide a weeder employing a plurality of obliquely positioned knives or blades, a vertically disposed cutting disk being arranged to operate in conjunction with each of the blades to more efficiently perform the cutting action, said blades and disks being vertically adjustable on the frame of the machine, to properly position the same with relation to the ground surface.

With these and other objects in view the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference indicate similar parts in the several views, Figure 1 is a top plan view of the machine. Fig. 2 is a section taken on line 2—2 of Fig. 1. Fig. 3 is a rear view. Fig. 4 is a fragmentary bottom view. Fig. 5 is an enlarged side elevation, showing the manner of securing one of the various cutting members of the machine to its support. Fig. 6 is an end view of same.

In the preparation of lands for planting purposes it is an essential requirement that all weeds, stalks, stubble, or other rank growths be removed before the seed is sown, so that the plants will derive the full benefit of the nutriment contained in the soil, thus greatly facilitating their healthy and vigorous growths. In the attainment of the above object I have devised an improved weeding machine which comprises the frame 5 preferably constructed of angle iron and of U-shaped form in plan. The ends of this frame are secured upon the transverse wheel shaft 6, to the opposite ends of which the traction wheels 7 are secured. A tongue 8 is centrally secured to the frame, and a driver's seat 8' is suitably secured on the rear end thereof. The shaft 6 is bent near its terminals and extends vertically a short distance and then is bent horizontally so as to pass directly over the tongue 8 to which it is secured by a clamp 6ᵃ. The usual draft attachments, (not shown) will also be attached to the forward ends of the tongue.

A rod or bar 9 is secured in the forward ends of the frame, and as shown is formed with a flattened surface 9' to which the cutter beams 10 are secured by means of the hinges 11. The rear ends of the cutter beams are directed downwardly and are of substantially semicircular form. The lower semicircular ends 10' of the beams are twisted to lie in a plane transverse to the vertical plane of the beam. A brace bar 10" extends transversely of the cutter beams and is passed through them near the beginning of the curvature 10'.

To t' lower extremity of each of the beams a cutting blade 12 is secured. These cutting blades 12 are in the shape of elongated parallelograms which are provided with holes 12ᵃ adjacent the shorter edges. These blades are sharpened on both long edges so that in case one edge becomes dulled a simple turning of the blade end for end will present a new cutting face to the weeds and stubble, the holes 12ᵃ admitting of securing the blades to the cutter bars at either end. It will be noted from reference to Fig. 1 that these blades are arranged in parallel relation and at an angle to the longitudinal body portion of the beams. Owing to the distortion of the rear ends of the beams, these blades are also obliquely positioned in a vertical plane.

A clamping member 20 is secured to each cutter beam 10, and on this is mounted a vertical arm 21, which is bent laterally as at 21ᵃ for a short distance and then extended downwardly, its lower end being reduced and screw threaded, and carrying a nut 22. Secured to the reduced portion of the arm 21 by the nut 22 is the bifurcated arm 23 which extends in a rearward and diagonally downward direction. In the lower end of the bifurcated arm is revolubly mounted a disk 13, the supporting members thereof being so disposed as to bring the forward point of the cutter blade 12, carried by its cutter beam 10 and the edge of the cutter disk in close proximity.

Transversely positioned centrally in the frame, there is a rotatable rod 14, to which the lower end of an adjusting lever 15 is secured. This lever carries a spring actuated dog 16 which is adapted to engage with the teeth of a rack segment 17 which is secured upon the tongue. The rod 14 carries a plurality of laterally disposed arms 18, the outer ends of which are pivotally connected to a vertical arm 19 secured upon each of the cutter beams 10. Thus it will be seen that as the lever 15 is moved forwardly or rearwardly, the blades 12 and cutter disks 13 will be lowered or raised to any desired position with relation to the ground surface.

In the operation of the machine after the blades have been properly adjusted, the movement of the machine over the ground will force the cutter blades and disks into contact with the weeds and owing to their disposition on the machine, the weeds will be cut close to the ground. The angular arrangement of the blades causes a shearing cut of the same as they contact with the stalks of the plants. Any vines or other matter which may lie closely upon the surface of the ground will be severed by means of the cutter disks 13. In this manner the ground may be rapidly cleared and harrowed for the reception of the seed.

The device is simple and may be inexpensively manufactured and is highly efficient and durable in use.

What is claimed is:

1. A machine of the character described comprising a wheel supported frame, a transverse rod secured in the forward end of said frame, a plurality of parallel longitudinal cutter beams hingedly secured to said rod, the rear end of each of said beams being downwardly curved to lie in a plane transverse to the vertical plane of the beams, a transverse brace bar secured to the beams, a cutting blade secured to the extremity of the curved end of each of the beams, said blades extending rearwardly of the beams and obliquely thereto, said blades having two edges and being adapted to be turned end for end and means for elevating or lowering said blades.

2. A machine of the character described comprising in combination, a wheel supported U-shaped frame, the rear of said frame being open, a transverse rod secured in the forward end of said frame, a plurality of parallel longitudinal cutter beams hingedly secured to said rod, obliquely disposed cutter blades secured to the rear ends of said beams, said blades being disposed at a vertical inclination, a transverse brace bar secured at its ends to each of the beams, a rod extending transversely and secured in the frame, a plurality of laterally extending arms carried by said rod, a vertical arm secured to each of said beams, said arms being pivotally connected at their ends, a tongue positioned centrally on the frame, and an adjusting lever secured at its lower end to said rod and adapted to rotate the rod to raise or lower the cutting blades.

3. A machine of the character described comprising in combination, a wheel supported U-shaped frame, a shaft secured in the front end of said frame, a plurality of cutter beams hingedly secured at their forward ends to said shaft, the rear ends of said beams being downwardly curved and twisted to lie in a plane transverse to the vertical plane of the beams, a cutting blade secured to the extremity of the curved end of each of the beams, said blades extending rearwardly of the beams and in oblique relation thereto, a rotatable cutting disk carried by each of the beams adjacent to the forward end of the blade, a transverse rod rotatably mounted in said frame, a lateral arm secured upon said rod adjacent to each of the cutter beams, said arms being pivotally connected to the beams, a tongue centrally positioned upon the frame, an adjusting lever rigidly secured at its lower end to the rod, a rack segment mounted upon the tongue and a spring actuated dog carried by the lever adapted to hold said lever in its adjacent position, to retain the cutting blades and disks against vertical movement.

In testimony whereof I affix my signature, in presence of two witnesses.

HENRY HARLAN GOE.

Witnesses:
F. J. FLEISCHER,
R. H. HART.